3,641,241
TYLOSIN - POLYOXYETHYLENE COMPOSITIONS FOR CONTROLLING MYCOPLASMA INFECTIONS
William W. Davis and Earl E. Ose, Indianapolis, Ind., assignors to Eli Lilly and Company, Indianapolis, Ind.
No Drawing. Continuation-in-part of application Ser. No. 624,146, Mar. 20, 1967. This application Nov. 24, 1969, Ser. No. 879,577
Int. Cl. A61k 21/00
U.S. Cl. 424—120
12 Claims

ABSTRACT OF THE DISCLOSURE

Compositions having enhanced activity against mycoplasma infections in poultry comprising a polyoxyethylene ether of the formula $H(OCH_2CH_2)_nOR$, wherein $n$ is 10 to 35 and R is cholesteryl or $C_{12}$–$C_{20}$ alkyl or alkenyl and tylosin or a nontoxic acid addition salt thereof and methods for employing such compositions.

CROSS REFERENCE

This application is a continuation-in-part of our earlier filed application, Ser. No. 624,146, filed Mar. 20, 1967, now abandoned.

BACKGROUND OF THE INVENTION

The occurrence of chronic respiratory disease (CRD) represents a serious economic problem in the poultry industry. The presence of the disease in a flock is manifested grossly by depressed weight gains as well as by the occurrence of air sac lesions and other histological lesions involving the trachea, lungs and other tissues. It is now reasonably well established that pleuropneumonia-like organisms (PPLO), specifically, *Mycoplasma gallisepticum*, are implicated as causative agents of CRD in poultry. A limited number of substances have been found to have some activity against mycoplasma infections. Such substances are generally antibiotics, more particularly, such antibiotics as aureomycin, bottromycin, terramycin, erythromycin, spiromycin, lincomycin, tylosin, and the like. While such antibiotics have demonstrated activity against the causative organisms producing CRD, their use still achieves only incomplete control of the disease. In the highly competitive poultry industry, any composition or method which would increase the efficacy of therapy would represent a valuable contribution to the art.

SUMMARY

It has now been unexpectedly discovered that compositions demonstrating enhanced activity against CRD are obtained by combining tylosin or a non-toxic acid addition salt thereof with a polyoxyethylene ether of the general formula $H(OCH_2CH_2)_nOR$ wherein $n$ is a number between about 10 and about 35 representing the average number of oxyethylene monomer units in the polyoxyethylene ether and R represents cholesteryl, $C_{12}$–$C_{20}$ alkyl or $C_{12}$–$C_{20}$ alkenyl. Preferred polyoxyethylene ethers are those in which $n$ is between 15 and 25 and R is cholesteryl, stearyl, cetyl and oleyl.

Illustrative of the groups which may be represented by R are cholesteryl, lauryl, myristyl, palmityl, stearyl, cetyl, oleyl and, in general, saturated and mono- or poly-unsaturated groups having the requisite chain length of 12 to 20 carbon atoms. While the alkyl and alkenyl groups represented by R have been illustrated herein by straight-chain radicals because of the ready availability of the alcohols from which such groups are derived, it will be understood by those skilled in the art that branched-chain radicals having the required carbon content will be equally effective. Further, although the oxyalkylene monomer unit of the polyethers described herein is the oxyethylene group, it will be readily apparent that some, or indeed all, of the oxyethylene units can be replaced by oxypropylene groups without rendering inoperative the polyethers. Moreover, modification of the polyethers by partial alkoxylation of the terminal hydroxyl groups does not impair their effectiveness.

The polyalkylene ethers employed in the compositions of the present invention are all prepared by methods well known in the art. More specifically, they are prepared by reacting an alcohol, ROH, with ethylene oxide in a molar ratio such that the desired number of oxyethylene monomer units will be incorporated into the resulting polyoxyethylene chain. It will be recognized that precise control of such a polymeric reaction is impossible to achieve, so that $n$ in the general formula must represent an average, rather than an absolute, value for the number of oxyalkylene units incorporated into the polyoxyalkylene chain.

The compositions comprising the antibiotic and a polyoxyalkylene ether of the general formula can be employed with equal effectiveness in controlling mycoplasma infections as either solid or liquid formulations. Solid formulations are generally administered to the animals as feed compositions comprising the antibiotic and the polyoxyethylene ether uniformly distributed in a normal poultry ration. Liquid formulations comprise the antibiotic and the polyoxyethylene ether dissolved in the drinking water consumed by the flock. It will be obvious to those skilled in the art that concurrent administration of both solid and liquid formulations can be employed to provide the desired levels of antibiotic and polyoxyethylene ether. Alternatively, one of the substances, as for example, the antibiotic, can be supplied at the proper level in a solid feed composition while the other, the polyoxyethylene ether, can be provided at the necessary level in a liquid formulation in drinking water.

DESCRIPTION OF THE PREFERRED EMBODIMENTS

Typically, solid formulations comprise between about 50 and about 2500 g. of a polyoxyethylene ether of the general formula and between about 100 and about 1500 g. of tylosin or a non-toxic acid addition salt thereof per ton of feed ration. Non-toxic acid addition salts of tylosin are well known in the art, and include salts with both inorganic and organic acids, as for example, phosphoric acid, sulfuric acid, citric acid, lactic acid and the like. Preferred formulations comprise between about 200 and about 500 g. of the polyoxyethylene ether and about 600 to about 1000 g. of the antibiotic. Various diluents, excipients, supplements, and the like can also be included in the finished feed ration. Preparation of the feed composition is suitably accomplished by employing one of two readily available procedures. Thus, for example, a solution comprising the antibiotic and the polyoxyethylene ether can be sprayed onto a feed premix which is then uniformly mixed with the bulk of the feed ration in accordance with procedures recognized in the art. Alternatively, a solution of the polyoxyethylene ether can be sprayed onto the antibiotic and the polyoxyalkylene ether coated antibiotic can then be incorporated by dry-mixing procedures with either a premix or a final feed composition. Either alternative employs as a starting point for the preparation of the feed composition, a concentrate composition comprising the antibiotic and the polyoxyethylene ether, the ratio of antibiotic to polyoxyethylene ether in the concentrate being between about 1:25 and about 30:1 depending upon the relative proportion of the two substances desired in the final feed composition. Typically, such a concentrate composition can be prepared by spraying the antibiotic and, if desired, suitable excipients, diluents, extending agents and the like, with a polyoxyethylene ether in a coating pan or other suitable mixing equipment which provides a rolling bed. Alternatively, with solid polyoxyethylene ethers, the concentrate composition can be prepared by blending the antiobiotic, polyoxyethylene ether and, if desired, excipients, diluents, extending agents and the like by suitable dry-mixing procedures.

It will be understood that the term "antibiotic" as employed herein includes the antibiotic as the free base or in the form of any of its nontoxic acid addition salts.

Liquid formulations can readily be prepared at the point of use by dissolving a composition comprising the antibiotic and a polyoxyethylene ether of the general formula in drinking water in a proportion such that the desired concentration is obtained. Suitably, final concentrations of from about 0.1 to about 5 g. of the polyoxyethylene ether per gallon, preferably from about 0.25 g. to about 0.5 g. per gallon and about 0.25 g. to about 5 g. of the antibiotic per gallon of drinking water are employed. The ratio of antibiotic to polyoxyethylene ether in the concentrate compositions employed for the preparation of the liquid formulations will, therefore, range from 1:20 to about 50:1. Other additives such as diluents, excipients, extending agents, and the like can, if desired, be included in the concentrate compositions. Especially desirable additives for such concentrate compositions are substances which permit more rapid solubilization of the polyoxyethylene ether in water in those instances in which the solubility rate of the ether in water is rather slow. Additional compatible chemotherapeutic agents can, if desired, also be included either at the time of preparation of the concentrate compositions or during the preparation of the final liquid formulation.

The compositions of the present invention can be employed chemotherapeutically for the treatment of CRD or prophylatically to prevent the outbreak of the disease. When employed chemotherapeutically, the compositions are usually administered either as solid or liquid formuations beginning at the time of earliest recognition of the presence of the disease in a flock and continuing for a period of up to five days, preferably from three to five days. Prophylatically, liquid or solid formulations of the compositions of the invention are usually administered during the first three to five days after hatching to minimize the possibility of an outbreak of CRD in the flock. Preferably, a second one- to five-day course of administration should follow after about four weeks.

The compositions of the present invention demonstrate an enhanced efficacy against CRD as compared to tylosin alone. The said enhanced efficacy is clearly evidenced especially by increased weight gains and decreased incidence of air sac lesions.

The practice of the invention is illustrated by the following nonlimiting examples.

Example 1

A concentrate composition suitable for the preparation of final formulations having enhanced activity against mycoplasma is prepared as follows:

A mixture of three parts by weight each of gelatin and water is warmed at a temperature of about 50° C. until a homogeneous melt is obtained. To the melt one part by weight of tylosin phosphate is added with stirring and stirring is continued for an additional half hour. The tylosin-gelatin mixture is removed from the mixing equipment, permitted to solidify and coarse ground in a grinder of the sausage-mill type. The ground mixture is vacuum dried at a temperature of about 50° C. for about 48 hours and is then subjected to a fine grinding operation. The gelatinized tylosin phosphate so prepared has a theoretical potency of approximately 250 mg./g. (determined as tylosin). A 10 kg. quantity of gelatinized tylosin phosphate having an assayed potency of 231 mg./g. is placed in a coating pan and, while being tumbled in the pan, is sprayed with 462 g. of Brij–78 (polyoxyethylene ether of the general formula wherein $n$ is 20 and R is stearyl) at a pressure of 20 p.s.i. at a rate of about 0.35 gallons per minute. The holding tank, liner and spraying head are heated throughout the operation in order to maintain fluidity of the polyoxyethylene ether. The product so obtained contains approximately 100 g. of tylosin activity and 20 g. of Brij–78 per pound of concentrate.

Example 2

A solid formulation of tylosin and a polyoxyethylene ether suitable for use as a concentrated premix is prepared as follows:

A mixture of 41.41 kg. of red oil (oleic acid) and 43.91 kg. of Brij–78 is charged into a jacketed solution make-up tank equipped with a propeller-type stirrer. Steam is injected into the tank jacket and when the solids are completely melted, the liquid mixture is stirred for about 10 minutes while the temperature is maintained between about 50° C. and 90° C. The heated mixture is pumped through a spraying system onto a carrier vehicle comprising 1503.7 kg. of extracted soybean feed in an operating vertical mixer of the Shelby type, and mixing is continued for an additional 15 minutes after all of the liquid mixture has been sprayed onto the carrier vehicle. Mixing is continued for another 30 minutes after 905.61 kg. of gelatinized tylosin (containing 220 kg. of tylosin activity as tylosin phosphate) are added to the mixer. The finished concentrated premix so prepared is transferred by means of a screw conveyer to bagging equipment and packaged in convenient package sizes for subsequent addition to complete feed ration in a proportion such that the final concentration in the feed is between about 100 and about 300 g. of Brij–78 and between about 500 and about 1500 g. of tylosin per ton of feed.

Example 3

A formulation suitable for the preparation of liquid compositions comprising tylosin and a polyoxyethylene ether is prepared as follows:

Into a suitable container are sieved 350 g. of lactose and 425 g. of powdered sugar. To the mixture are added 25 g. of Brij–78. The resulting mix is placed in an oven and heated until the temperature is about 70–80° throughout. The material is then transferred to a suitable mixer and mixed until uniform and cool. Upon the addition of 200 g. of finely powdered tylosin (activity as tylosin tartrate), the entire lot is again mixed until homogeneous. The resulting homogeneous mixture is sieved through a screen of suitable size into a covered storage container and kept in a cool, dry area prior to filling into individual packages. The product so prepared can be dissolved in the required amounts in drinking water to provide a liquid formulation having between about 0.1 g. to about 0.6 g. of Brij–78 and between about 0.8 g. to about 4.8 g. of tylosin per gallon.

Example 4

Four-week old broiler chickens were divided into 18 groups of 15 birds per group so that each group had the same average weight per bird. The chickens were housed in four-deck batteries in five separate brooder houses. The groups were divided as follows:

(A) Four groups, placed in different brooder houses in such a way that one group was at each level in a four-deck battery, were treated for five days with a treated ration containing 1000 g. of tylosin per ton of feed.

(B) Four groups, placed as in A, were treated for five days with a treated ration containing 1000 g. of tylosin phosphate and 200 g. of Brij–78 per ton of feed. The feed employed for these groups was prepared by spraying the polyoxyethylene ether onto a tylosin-soybean meal premix and then incorporating the mixture into the finished feed.

(C) Four groups, placed as in A, were treated for five days with a feed containing 1000 g. of tylosin phosphate and 200 g. of Brij–78 per ton of feed. The feed employed for these groups was prepared by spraying the polyoxyethylene ether onto the tylosin phosphate prior to preparation of the premix.

(D) Two groups, placed in the lower two decks of a fourth brooder house, served as infected controls and received no treatment subsequent to infection.

(E) Two groups, placed in the upper two decks of the brooder house used for D, served as infected controls which received no antibiotic but were given 250 mg. of Brij–78 per gallon of drinking water for three days post-infection.

(F) Two groups, placed in two decks in a fifth brooder house, served as non-infected controls.

At the start of the experiment, all of the chickens except those in the non-infected control groups were given 0.2 ml. each of a broth culture of *Mycoplasma gallisepticum* intravenously and into the posterior air sac. Except for the control groups, treated feed was given immediately following infection for a total of five days. After the fifth day all chickens were fed a broiler ration without antibiotic of polyoxyethylene ether.

At the beginning of the trial ten chickens were sacrificed and examined for air sac lesions, and blood samples were examined serologically for *M. gallisepticum* antibody. All ten of the chickens were serologically negative and had normal air sacs.

Four weeks after infection, each chicken was weighed, examined at necropsy for air sac lesions, and had a blood sample examined serologically. All positive lesions were cultured for mycoplasma, and in those groups having fewer than five chickens with lesions, trachea from five chickens in the group were cultured for the organism. The results are shown in Table I.

TABLE I

| Treatment | | Replicate | Avg. weight/ chicken (gms.) | Air sac lesions [1] | M. gallisepticum antibody test [1] | M. gallisepticum culture [1] |
|---|---|---|---|---|---|---|
| A | Tylosin phosphate, 1,000 gms./ton | 1 | 1,734 | 11/15 | 14/15 | 6/8 |
| | | 2 | 1,685 | 10/15 | 12/15 | 8/10 |
| | | 3 | 1,667 | 7/15 | 15/15 | 8/10 |
| | | 4 | 1,605 | 10/15 | 14/14 | 9/11 |
| Average | | | 1,673 | | | |
| Total | | | | 38/60 | 55/59 | 31/39 |
| B | Tylosin phosphate, 1,000 gms./ton; Brij–78, 200 gms./ton, sprayed on premix. | 1 | 1,750 | 3/15 | 9/15 | 3/6 |
| | | 2 | 1,795 | 1/15 | 14/15 | 1/5 |
| | | 3 | 1,731 | 7/15 | 13/15 | 8/10 |
| | | 4 | 1,720 | 8/15 | 10/14 | 4/9 |
| Average | | | 1,749 | | | |
| Total | | | | 19/60 | 46/59 | 16/30 |
| C | Tylosin phosphate, 1,000 gms./ton; Brij–78, 200 gms./ton, sprayed on tylosin phos. | 1 | 1,760 | 4/15 | 14/15 | 7/9 |
| | | 2 | 1,708 | 1/15 | 8/15 | 5/6 |
| | | 3 | 1,719 | 3/15 | 14/15 | 4/7 |
| | | 4 | 1,733 | 4/15 | 11/15 | 4/6 |
| Average | | | 1,730 | | | |
| Total | | | | 12/60 | 47/60 | 20/28 |
| D | Infected control | 1 | 1,397 | 14/14 | 14/14 | 6/12 |
| | | 2 | 1,365 | 15/15 | 15/15 | 8/12 |
| Average | | | 1,386 | | | |
| Total | | | | 29/29 | 29/29 | 14/24 |
| E | Infected control; Brij–78, 250 mg./gal | 1 | 1,435 | 15/15 | 15/15 | 9/10 |
| | | 2 | 1,439 | 14/14 | 14/14 | 6/14 |
| Average | | | 1,437 | | | |
| Total | | | | 29/29 | 29/29 | 15/24 |
| F | Normal control | 1 | 1,798 | 0/15 | 0/15 | 0/5 |
| | | 2 | 1,816 | 0/15 | 0/15 | 0/5 |
| Average | | | 1,807 | | | |
| Total | | | | 0/30 | 0/30 | 0/10 |

[1] Number positive/number examined.

Statistical evaluation of the data indicates that the group receiving only the polyoxyethylene ether was not benefited and that the two groups receiving tylosin and the polyoxyethylene ether in the feed were benefited to a significantly greater extent than those receiving tylosin alone when evaluated on the basis of weight, frequency of air sac lesions and formation of *M. gallisepticum* antibodies. It will be noted that in the groups receiving both tylosin and the polyoxyethylene ether, increased weight gains and decreased incidence of air sac lesions is apparent, not only with respect to untreated infected control groups, but also with respect to those groups treated with tylosin alone.

Example 5

The enhanced activity of liquid formulations comprising tylosin and a polyoxyethylene ether was demonstrated in an experiment analogous to that described in Example 4. The treatment levels employed and the results are shown in Table II. As in the experiment employing solid formulations, the results clearly show that the combination of tylosin and polyoxyethylene ether produces better weight gains and decreases the incidence of air sac lesions not only with respect to untreated animals but also with respect to those treated with tylosin along.

TABLE II

| Treatment | | Replicate | Avg. weight/ chicken (gms.) | Air sac lesions [1] | M. gallisepticum antibody test [1] |
|---|---|---|---|---|---|
| A | Tylosin, 2.0 gm./gal | 1 | 1,621 | 9/14 | 14/14 |
|   |                     | 2 | 1,577 | 10/15 | 15/15 |
|   |                     | 3 | 1,617 | 9/15 | 13/15 |
|   |                     | 4 | 1,647 | 9/15 | 15/15 |
| Average | | | 1,615 | | |
| Total | | | | 37/59 | 57/59 |
| B | Tylosin, 2.0 gm./gal.; Brij-78 100 mg./gal | 1 | 1,734 | 4/14 | 8/14 |
|   |                                            | 2 | 1,683 | 10/15 | 13/15 |
|   |                                            | 3 | 1,663 | 12/15 | 14/15 |
|   |                                            | 4 | 1,611 | 5/15 | 8/15 |
| Average | | | 1672 | | |
| Total | | | | 31/59 | 43/59 |
| C | Tylosin, 2.0 gm./gal.; Brij-78 250 mg./gal | 1 | 1,635 | 4/15 | 9/15 |
|   |                                            | 2 | 1,648 | 7/15 | 8/15 |
|   |                                            | 3 | 1,649 | 7/15 | 13/15 |
|   |                                            | 4 | 1,656 | 7/15 | 11/15 |
| Average | | | 1,647 | | |
| Total | | | | 25/60 | 41/60 |
| D | Tylosin, 2.0 gm./gal.; Brij-78 500 mg./gal | 1 | 1,599 | 4/14 | 11/14 |
|   |                                            | 2 | 1,709 | 7/15 | 9/15 |
|   |                                            | 3 | 1,667 | 5/14 | 9/14 |
|   |                                            | 4 | 1,678 | 2/14 | 7/14 |
| Average | | | 1,663 | | |
| Total | | | | 18/57 | 36/57 |
| E | Normal controls | 1 | 1,715 | 0/15 | 0/15 |
|   |                 | 2 | 1,683 | 0/15 | 0/15 |
| Average | | | 1,700 | | |
| Total | | | | 0/30 | 30/30 |
| F | Infected controls | 1 | 1,034 | 11/12 | 12/12 |
|   |                   | 2 | 1,005 | 12/12 | 12/12 |
| Average | | | 1,020 | | |
| Total | | | | 23/24 | 24/24 |

[1] Number positive/number examined.

Example 6

The enhancement of the activity of tylosin against mycoplasma infections was observed in the treatment of a natural outbreak of the infection. During the holding period prior to initiation of an induced infection experiment with a large group of chickens, the flock exhibited symptoms of respiratory disease. Blood samples and examination for air sac lesions indicated an early infection with *Mycoplasma gallisepticum*. The chickens were divided into three groups of 75 chickens each and were housed in separate areas. One group served as an untreated control, a second group was treated for three days with drinking water containing 2 g. per gallon of tylosin and a third group was treated for three days with drinking water containing 2 g. per gallon of tylosin and 200 mg. per gallon of Solution C-24, a polyoxyethylene ether of the general formula $H(OCH_2CH_2)_nOR$ wherein $n$ is 24 and R is cholesteryl. The three groups were evaluated after three weeks and the results, shown in Table III, indicate that, especially with regard to weight gains, the group receiving both tylosin and the polyoxyethylene ether was benefited to a considerably greater extent than the group receiving tylosin alone.

TABLE III

| Treatment | Avg. weight/ chicken (gms.) | Air sac lesions [1] |
|---|---|---|
| A ____ 2 gm./gal. tylosin | 1,655 | 24/74 |
| B ____ 2 gm./gal. tylosin, 200 mg./gal. Solulan | 1,731 | 16/73 |
| C ____ Infected controls | 1,495 | 60/74 |

[1] Number positive/number examined.

Example 7

Four-week old broiler chickens were divided into 10 groups of 15 birds per group so that each group had the same average weight per bird: The chickens were housed in five separate brooder houses. The groups were divided as follows:

(A) Two groups, placed in different brooder houses, where treated for five days with a treated ration containing 600 grams of tylosin phosphate per ton of feed.

(B) Two groups, placed as in A, were treated for five days with a treated ration containing 600 grams of tylosin phosphate and 100 grams of Brij 96 per ton of feed. (Brij 96 is a polyoxyethylene ether of the general formula wherein $n$ is 10 and R is oleyl.)

(C) Two groups, placed as in A, were treated for five days with a feed containing 600 grams of tylosin phosphate and 100 grams of Brij 98 per ton of feed. (Brij 98 is a polyoxyethylene ether of the general formula wherein $n$ is 20 and R is oleyl.)

(D) Two groups, placed in a fourth brooder house, served as infected controls and received no treatment subsequent to infection.

(E) Two groups, placed in a fifth brooder house, served as non-infected controls.

At the start of the experiment, all of the chickens except those in the non-infected control groups were given 0.2 ml. each of a broth culture of *Mycoplasma gallisepticum* intravenously and into the posterior air sac. Except for the control groups, treated feed was given immediately following infection for a total of five days. After the fifth day all chickens were fed a broiler ration without antibiotic or polyoxyethylene ether.

At the beginning of the trial ten chickens were sacrificed and examined for air sac lesions and blood samples were examined serologically for *M. gallisepticum* antibody. All ten of the chickens were serologically negative and had normal air sacs.

Four weeks after infection, each chicken was weighed, examined at necropsy for air sac lesions, and had a blood sample examined serologically.

The results obtained are shown in the attached table and demonstrate that those groups receiving both tylosin and the polyoxyethylene ether were benefited to a significantly greater extent than the groups receiving tylosin alone.

TABLE IV

| Treatment | | Replicate | Avg. weight/ chicken | Air sac lesions [1] | M. gallisepticum antibody test [1] |
|---|---|---|---|---|---|
| A | Tylosin phosphate, 600 g. per ton | 1 | 1,829 | 14/15 | 15/15 |
|   |   | 2 | 1,653 | 13/15 | 15/15 |
| Average |   |   | 1,741 |   |   |
| B | Tylosin phosphate, 600 g. per ton; Brij 96 100 g. per ton. | 1 | 1,849 | 9/15 | 15/15 |
|   |   | 2 | 1,846 | 13/15 | 14/15 |
| Average |   |   | 1,847 |   |   |
| C | Tylosin phosphate, 600 g. per ton; Brij 98 100 g. per ton. | 1 | 1,815 | 8/15 | 15/15 |
|   |   | 2 | 1,945 | 10/14 | 14/14 |
| Average |   |   | 1,880 |   |   |
| D | Infected control | 1 | 1,486 | 13/14 | 14/14 |
|   |   | 2 | 1,526 | 14/14 | 14/14 |
| Average |   |   | 1,506 |   |   |
| E | Normal control | 1 | 1,928 | 1/15 | 7/15 |
|   |   | 2 | 1,961 | 0/15 | 6/15 |
| Average |   |   | 1,944 |   |   |

[1] Positive/number examined.

We claim:

1. A composition having enhanced activity against mycoplasma infections in poultry which comprises a solid feed composition or water, tylosin or a non-toxic acid addition salt thereof and a polyoxyethylene ether of the formula $H(OCH_2CH_2)_nOR$, where $n$ is a number between about 10 and about 35 and R is cholesteryl, $C_{12}$–$C_{20}$ alkyl or $C_{12}$–$C_{20}$ alkenyl, the ratio of antibiotic to polyoxyethylene ether in said composition being between about 1:25 and about 30:1.

2. A solid feed composition according to claim 1 wherein the polyoxyethylene ether is present in a concentration of between about 50 and about 2500 g. per ton of feed and the tylosin or non-toxic acid addition salt thereof is present in a concentration between about 100 and about 1500 g. per ton of feed.

3. A composition according to claim 1 wherein the polyoxyethylene ether has the formula $H(OCH_2CH_2)_nOR$ wherein $n$ is 20 and R is stearyl.

4. A composition according to claim 2 whch comprises about 1000 g. per ton of feed of tylosin phosphate and about 200 g. per ton of feed of the polyoxyethylene ether.

5. An aqueous composition according to claim 1 wherein the polyoxyethylene ether is present in a concentration of between about 0.1 g. and about 5 g. per gallon of water and the tylosin or non-toxic acid addition salt thereof is present in a concentration between about 0.25 g. and about 5 g. per gallon of water.

6. The composition of claim 5 wherein the polyoxyethylene ether has the formula $H(OCH_2CH_2)_nOR$ wherein $n$ is 20 and R is stearyl.

7. The composition of claim 6 wherein the polyoxyethylene ether is present in a concentration of between about 0.25 g. and 0.5 g. per gallon of water and the tylosin is present in a concentration of 2 g. per gallon of water.

8. A method for controlling mycoplasma infections in poultry which comprises the oral administration to said poultry of the composition of claim 2 for a period of 1 to 5 days.

9. A method for controlling mycoplasma infections in poultry which comprises the oral administration to said poultry of the composition of claim 3 for a period of 1 to 5 days.

10. A method for controlling mycoplasma infections in poultry which comprises the oral administration to said poultry of the composition of claim 4 for a period of 1 to 5 days.

11. A method for controlling mycoplasma infections in poultry which comprises the oral administration of said poultry of the composition of claim 5 for a period of 1 to 5 days.

12. A method for controlling mycoplasma infections in poultry which comprises the oral administration of said poultry of the composition of claim 6 for a period of 1 to 5 days.

References Cited

UNITED STATES PATENTS 3,178,341    4/1965    Hamill et al. _____ 424—120

OTHER REFERENCES

Schwartz et al.: Surface Active Agents and Detergents, vol. II, 1958, pp. 606, 611–614.

Atlas Surfactants, 1962.

Veterinary Bulletin, 1965, p. 621 (3765).

Veterinary Drug Encyclopedia, 1965, p. 157.

SAM ROSEN, Primary Examiner